United States Patent
Choi et al.

(10) Patent No.: US 11,696,013 B2
(45) Date of Patent: Jul. 4, 2023

(54) ELECTRONIC DEVICE AND RECORDING METHOD THEREOF

(71) Applicant: Samsung Electronics Co., Ltd., Suwon-si (KR)

(72) Inventors: Nari Choi, Suwon-si (KR); Hwayong Kang, Suwon-si (KR); Jiyeon Kim, Suwon-si (KR); Kyungyul Seo, Suwon-si (KR); Saebyuk Sheen, Suwon-si (KR); Younghak Oh, Suwon-si (KR); Jaehan Lee, Suwon-si (KR); Junho Choi, Suwon-si (KR); Hoik Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/966,995

(22) PCT Filed: Feb. 21, 2019

(86) PCT No.: PCT/KR2019/002108
§ 371 (c)(1),
(2) Date: Aug. 3, 2020

(87) PCT Pub. No.: WO2019/164286
PCT Pub. Date: Aug. 29, 2019

(65) Prior Publication Data
US 2021/0029293 A1   Jan. 28, 2021

(30) Foreign Application Priority Data

Feb. 23, 2018 (KR) .................. 10-2018-0022241

(51) Int. Cl.
H04N 5/232 (2006.01)
H04N 23/62 (2023.01)
(Continued)

(52) U.S. Cl.
CPC ........... H04N 23/62 (2023.01); H04N 5/2621 (2013.01); H04N 5/77 (2013.01); H04N 23/675 (2023.01); *G06F 3/0482* (2013.01)

(58) Field of Classification Search
CPC ............ G06F 3/0482; H04N 5/232127; H04N 5/23216; H04N 5/23229; H04N 5/23254;
(Continued)

(56) References Cited

U.S. PATENT DOCUMENTS 9,143,671 B2 * 9/2015 Nonaka .............. H04N 5/23293
10,523,862 B2   12/2019 Nakagawa
(Continued)

FOREIGN PATENT DOCUMENTS

CN   1668082 A    9/2005
CN   101241222 A  8/2008
(Continued)

OTHER PUBLICATIONS

Extended European Search Report dated Nov. 10, 2020, issued in European Patent Application No. 19757274.6.
(Continued)

*Primary Examiner* — Thai Q Tran
*Assistant Examiner* — Stephen R Smith
(74) *Attorney, Agent, or Firm* — Jefferson IP Law, LLP

(57) ABSTRACT

Various embodiments of the present invention relate to an electronic device and a recording method thereof. The electronic device may comprise: a touch screen; an image sensor for capturing an image; a processor operatively connected to the touch screen and the image sensor; and a memory operatively connected to the processor, wherein the memory stores instructions which, when executed, cause the processor to designate at least a partial screen area of the touch screen as a motion detection area, determine whether a motion is detected in the motion detection area, and control
(Continued)

the image sensor, in response to detecting the motion in the motion detection area, so as to perform super slow recording. Various other embodiments are also possible.

16 Claims, 20 Drawing Sheets

(51) Int. Cl.
*H04N 5/262* (2006.01)
*H04N 5/77* (2006.01)
*H04N 23/67* (2023.01)
*G06F 3/0482* (2013.01)

(58) Field of Classification Search
CPC .. H04N 5/232933; H04N 5/2621; H04N 5/77; H04N 5/783
USPC ...... 386/228; 348/143, 207.11, 220.1, 222.1, 348/333.02, 333.11
See application file for complete search history.

(56) References Cited

U.S. PATENT DOCUMENTS

| | | | |
|---|---|---|---|
| 2008/0231706 A1 | 9/2008 | Connell et al. | |
| 2009/0231453 A1* | 9/2009 | Huang | H04N 5/23218 382/103 |
| 2010/0020222 A1* | 1/2010 | Jones | H04N 5/2353 348/333.02 |
| 2015/0256749 A1* | 9/2015 | Frey | H04N 5/77 348/220.1 |
| 2016/0065832 A1* | 3/2016 | Kim | H04N 13/128 348/207.11 |
| 2016/0173810 A1* | 6/2016 | Nakagawa | H04N 5/772 386/225 |
| 2016/0182866 A1* | 6/2016 | Landqvist | H04N 5/341 348/143 |
| 2016/0255268 A1* | 9/2016 | Kang | G06F 3/04883 348/333.11 |
| 2016/0269636 A1* | 9/2016 | Kuchiki | G06T 7/90 |
| 2017/0200472 A1 | 7/2017 | Munukutla et al. | |
| 2017/0214786 A1 | 7/2017 | Lee et al. | |
| 2017/0223261 A1* | 8/2017 | Shimizu | G06V 10/751 |
| 2018/0001138 A1 | 1/2018 | Sinha et al. | |
| 2018/0007254 A1 | 1/2018 | Tsuji | |
| 2018/0035017 A1 | 2/2018 | Kim | |
| 2018/0309930 A1* | 10/2018 | Gyotoku | H04N 5/2254 |
| 2018/0324347 A1* | 11/2018 | Shimosato | H04N 5/23229 |
| 2018/0332218 A1* | 11/2018 | Yoshimura | H04N 5/23232 |
| 2019/0132520 A1* | 5/2019 | Gupta | H04N 5/232127 |
| 2019/0141307 A1* | 5/2019 | Youn | H04N 5/23296 |
| 2020/0382724 A1* | 12/2020 | Pena | G06F 3/0484 |

FOREIGN PATENT DOCUMENTS

| | | |
|---|---|---|
| CN | 101272483 A | 9/2008 |
| CN | 106817537 A | 6/2017 |
| CN | 107211091 A | 9/2017 |
| CN | 107396019 A | 11/2017 |
| CN | 107454322 A | 12/2017 |
| GB | 2541713 A | 3/2017 |
| JP | 2017-108286 A | 6/2017 |
| KR | 10-2011-0093040 A | 8/2011 |
| KR | 10-1408118 B1 | 6/2014 |
| KR | 10-2017-0089251 A | 8/2017 |
| KR | 10-2018-0012161 A | 2/2018 |

OTHER PUBLICATIONS

Chinese Office Action dated Apr. 2, 2021, issued in Chinese Patent Application No. 201980014191.8.
Indian Office Action dated May 26, 2021, issued in Indian Patent Application No. 202017033563.
Chinese Office Action dated Oct. 27, 2021, issued in Chinese Patent Application No. 201980014191.8.
European Office Action dated Dec. 1, 2021, issued in European Patent Application No. 19757274.6.
Chinese Office Action dated Sep. 22, 2022, issued in Chinese Patent Application No. 201980014191.8.
European Office Action dated Oct. 27, 2022, issued in European Patent Application No. 19757274.6.

* cited by examiner

ELECTRONIC DEVICE AND RECORDING METHOD THEREOF

TECHNICAL FIELD

Various embodiments of the present invention relate to an electronic device and a recording method thereof.

BACKGROUND ART

Electronic devices (e.g., mobile terminals, smart phones, or wearable devices) may provide various functions. For example, in addition to a basic voice communication function, a smart phone may provide a function for short-range wireless communication (e.g., Bluetooth, Wi-Fi, or Near-Field Communication (NFC)), a function for mobile communication (e.g., Third Generation (3G), 4G, or 5G), a function of reproducing music or a moving image, a function of capturing a photograph or a moving image, a navigation function, or the like.

Generally, the electronic device may capture a moving image at a speed of 30 frames per second (fps). A recent electronic device includes a high-performance image sensor. For example, the recent electronic device may include an image sensor capable of capturing of an image at a speed which is several times to tens of times faster than normal capturing. The recent electronic device may support high-speed capturing.

DISCLOSURE OF INVENTION

Technical Problem

An electronic device may manually perform high-speed capturing according to a user's request. Accordingly, it may be difficult for the user of the electronic device to capture an object (or a subject) moving at a high speed (or instantaneous) or perform high-speed capturing at a desired moment (e.g., at a moment when a meteor falls). For example, before the user presses a super-fast capturing button (or a capturing menu, a capturing icon, or the like), the object disappears or a moment, at which the user desires to capture an image, may pass.

In order to solve the above-mentioned problems, various embodiments of the present invention may provide an electronic device capable of automatically performing super-fast capturing (or super-slow recording) when a designated condition is satisfied, and a recording method thereof.

Various embodiments of the present invention may provide an electronic device capable of automatically performing super-fast capturing when motion is detected in a designated area of a screen, and a recording method thereof.

Various embodiments of the present invention may provide an electronic device capable of changing a size, a ratio, and/or a position of a designated area for detection of motion, and a recording method thereof.

Various embodiments of the present invention may provide an electronic device capable of changing a focal point of an image sensor to a position of an object of super-fast capturing during super-fast capturing, and a recording method thereof.

Solution to Problem

In accordance with an aspect of the present invention, an electronic device may include: a touch screen; an image sensor configured to acquire an image; a processor configured to be operatively connected to the touch screen and the image sensor; and a memory configured to be operatively connected to the processor, wherein the memory is configured to store instructions that, when executed, cause the processor to: designate at least a partial area of a screen of the touch screen as a motion detection area; determine whether motion is detected in the motion detection area; and control the image sensor so as to perform super-slow recording, in response to detection of the motion in the motion detection area.

In accordance with another aspect of the present invention, a recording method of an electronic device may include: designating at least a partial area of a screen as a motion detection area; determining whether motion is detected in the motion detection area; and controlling an image sensor so as to perform super-slow recording, in response to detection of the motion in the motion detection area.

Advantageous Effects of Invention

Various embodiments of the present invention allow automatic execution of super-slow recording, and thus can improve user convenience of the super-slow recording.

BEST MODE FOR CARRYING OUT THE INVENTION

Figure 1:
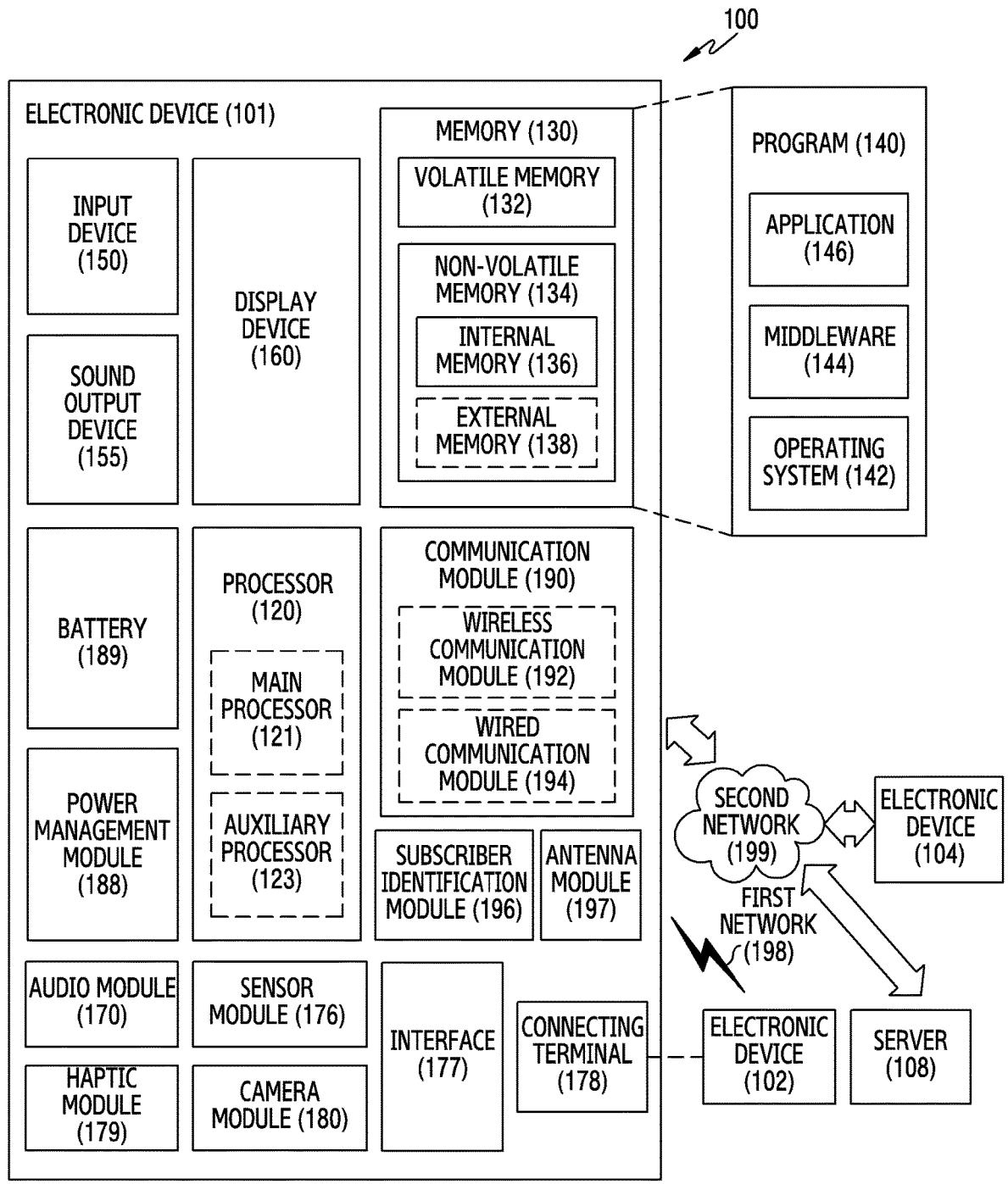
FIG. 1 is a block diagram of an electronic device in a network environment according to various embodiments of the present invention.

Hereinafter, various embodiments of the present invention will be described with reference to the accompanying drawings. In the disclosure, particular embodiments are illustrated by way of example in the drawings and a detailed description related thereto is made, but the particular embodiments and the related detailed description are not intended to limit various embodiments of the present invention to particular forms. For example, it will be apparent to those having common knowledge in the technical field to which the present invention pertains that embodiments of the present invention may be variously modified.

Prior to a detailed description, hereinafter, the term "super-slow recording" refers to a recording method for capturing an image at a speed (e.g., 960 fps), which is tens of times faster than a normal capturing speed (e.g., 30 fps), and reproducing the image, captured at the fast speed, at a normal speed so as to provide a slow motion effect of movement, the speed of which is slower than a normal speed. For example, when an image is captured for 0.2 seconds at 960 fps and the image is reproduced at 30 fps, the image may be reproduced for 6.4 seconds. As described above, the image captured for 0.2 seconds may be reproduced very slowly as an image captured for 6.4 seconds.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the haptic module 179, the antenna module 197, or the SIM 196) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The processor 120 according to an embodiment of the present invention may control super-slow recording (or super-fast capturing). For example, when a designated condition is satisfied (e.g., when motion or a particular object (e.g., a human or an automobile) is detected in a designated area of a screen), the processor 120 may control automatic execution of super-slow capturing. The processor 120 will be described in detail below.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch. For example, the display apparatus 160 may be a touch screen.

The display device 160 according to an embodiment of the present invention may display various screens and interfaces for super-fast capturing. This configuration will be described in detail below.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

During super-fast capturing, the sensor module 176 according to an embodiment of the present invention may generate an electrical signal or a data value corresponding to movement of the electronic device 101, and may transmit the same to the processor 120.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes. For example, the camera module 180 may be disposed on one side (e.g., a front surface, a rear surface, or a lateral surface) of the electronic device 101.

The camera module 180 according to an embodiment of the present invention may support fast or super-fast capturing, the speed of which is tens of times or hundreds of times faster than a first capturing speed (e.g., 30 fps). For example, the camera module 180 may support super-fast capturing at a second capturing speed (e.g., 960 fps). During super-fast capturing, the camera module 180 according to an embodiment of the present invention may automatically move a focal point to an object to be captured.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device (e.g., the electronic device 101) according to various embodiments of the present invention may include: a touch screen (e.g., the display apparatus 160); an image sensor (e.g., the camera module 180) configured to acquire an image; a processor (e.g., the processor 120) configured to be operatively connected to the touch screen and the image sensor; and a memory (e.g., the memory 130) configured to be operatively connected to the processor, wherein the memory is configured to store instructions that, when executed, cause the processor to: designate at least a partial area of a screen of the touch screen as a motion detection area; determine whether a motion is detected in the motion detection area; and control the image sensor so as to perform super-slow recording, in response to detecting the motion in the motion detection area.

According to various embodiments, the memory may be configured to further store at least one of: an instruction that causes the processor to notify a user that a motion detection using the motion detection area is being performed; or an instruction that causes the processor to notify the user that the super-slow recording is being performed.

According to various embodiments, the memory may be configured to further store instructions that cause the processor to change at least one of a size, a ratio, or a position of the motion detection area in response to an editing request for the motion detection area.

According to various embodiments, the electronic device may further include at least one sensor configured to detect movement of the electronic device, wherein the memory is configured to further store instructions that cause the processor to stop the detection of the motion in the motion detection area in response to detecting the movement of the electronic device via the at least one sensor.

According to various embodiments, the memory may be configured to further store instructions that cause the processor to set a focal point of the image sensor based on a center of the motion detection area in response to designating the motion detection area.

According to various embodiments, the memory may be configured to further store instructions that cause the processor to move the focal point of the image sensor to the center of the motion detection area in response to detecting the motion in the motion detection area.

According to various embodiments, the memory may be configured to further store an instruction that causes the processor to configure an area for moving the focal point of the image sensor so as to be larger than the motion detection area.

According to various embodiments, the memory may be configured to further store instructions that cause the processor to: track a moving path of an object of the super-slow recording; expect a moving path based on a tracking result; and move the motion detection area along the expected moving path.

According to various embodiments, the memory may be configured to further store an instruction that causes the processor to execute super-slow recording in response to a user input selecting a super-slow recording menu displayed on one side of a screen.

According to various embodiments, the memory may be configured to further store an instruction that causes the processor to, when a touch is detected at one side of the screen while the motion is detected in the motion detection area, move the motion detection area and a focal point of the image sensor based on a point at which the touch is generated.

Figure 2:
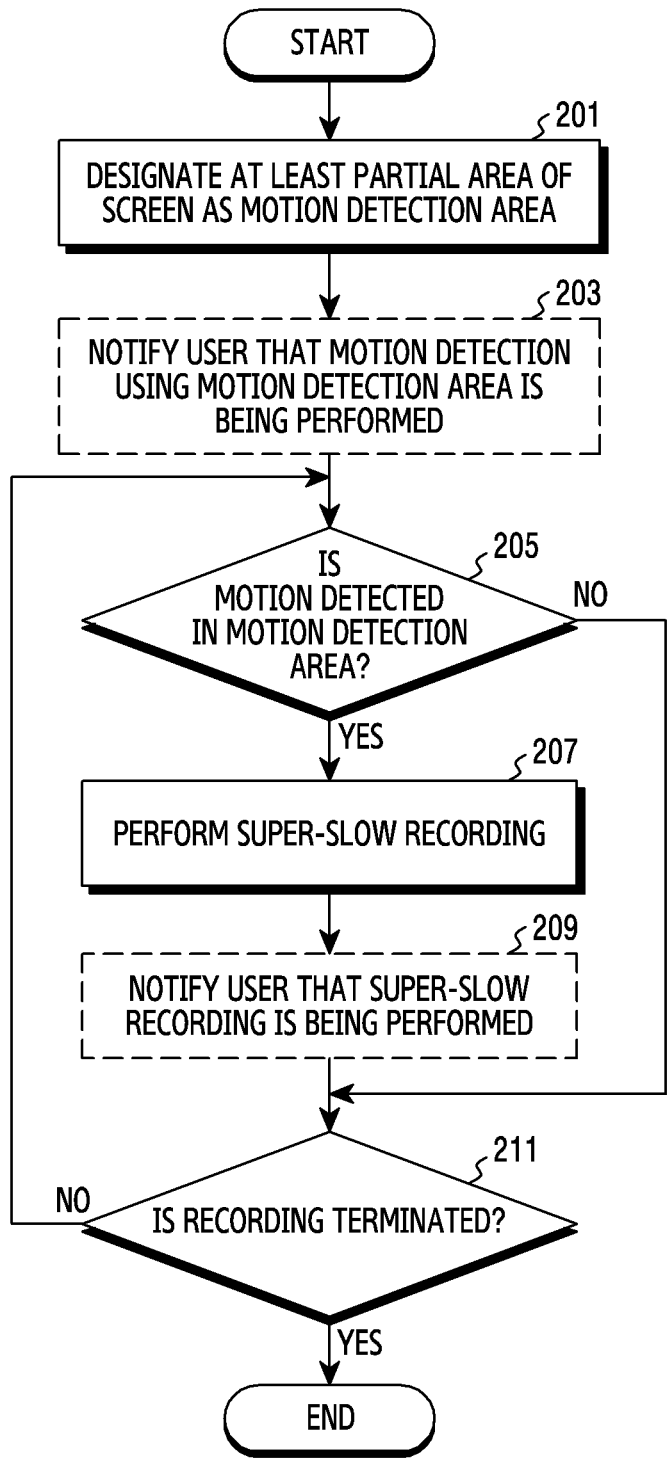
FIG. 2 is a flowchart illustrating a recording method of an electronic device according to an embodiment of the present invention.
Figure 3A:
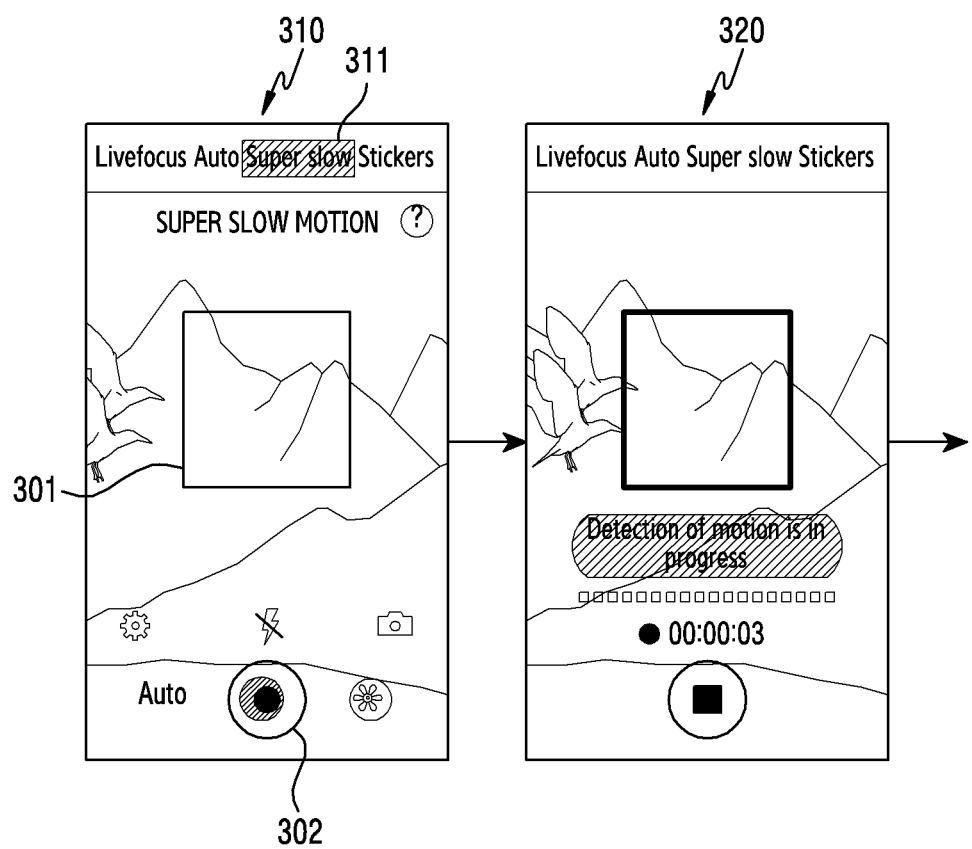
FIGS. 3A, 3B and FIG. 4 are exemplary views for describing a recording method of an electronic device according to an embodiment of the present invention.
Figure 4:
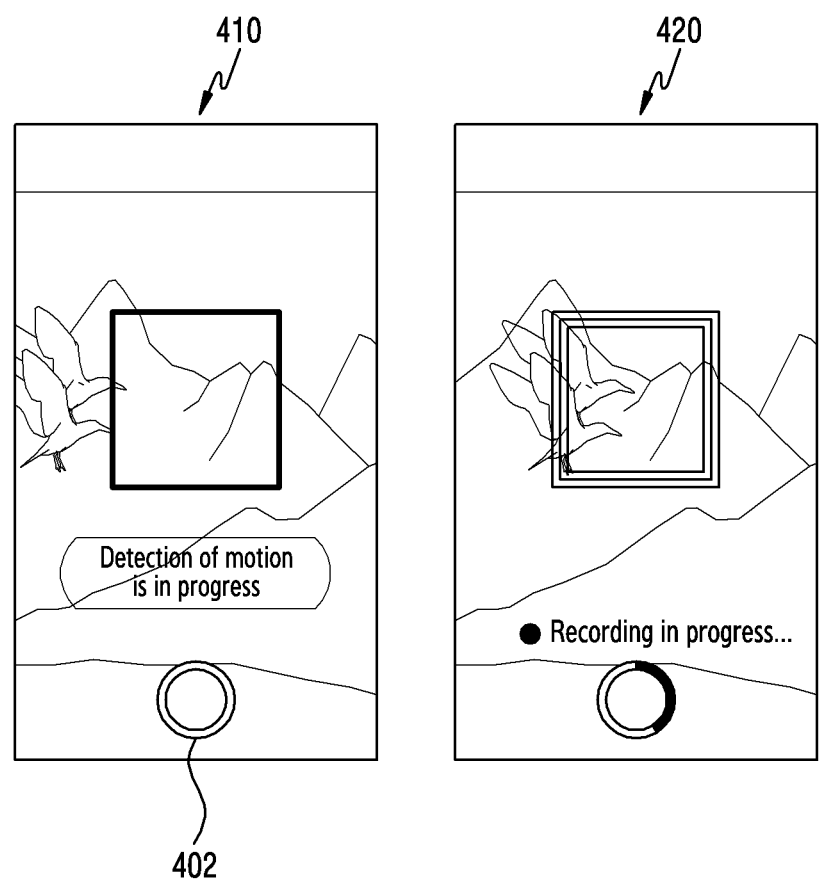

FIG. 2 is a flowchart illustrating a recording method of an electronic device according to an embodiment of the present invention, and FIG. 3A, FIG. 3A, and FIG. 4 are an exemplary view for describing a recording method of an electronic device according to an embodiment of the present invention.

Figure 3B:
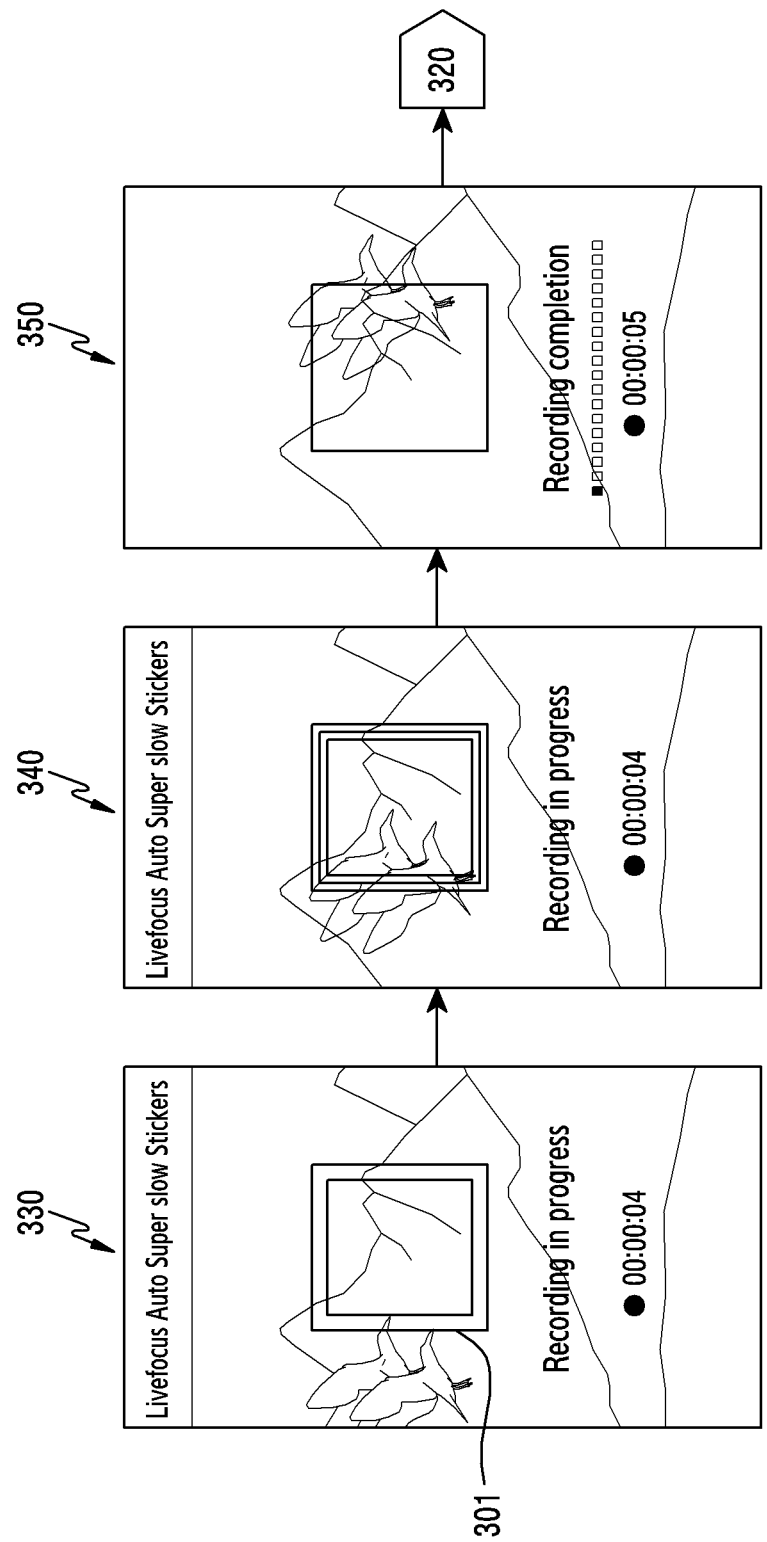

Referring to FIG. 2 to FIG. 4, in operation 201, a processor (e.g., the processor 120 of FIG. 1) of the electronic device (e.g., the electronic device 101 of FIG. 1) according to an embodiment of the present invention may designate at least a partial area of a screen as a motion detection area.

The motion detection area may be designated automatically or manually. For example, as indicated by reference numeral 310 in FIG. 3A, when a super-slow recording function 311 is activated, the processor may designate, as a motion detection area 301, an area of a size (e.g., one third of a screen size) predesignated (or configured) with reference to a center of a super-slow recording standby screen (e.g., a preview screen). The standby screen may include a visual indicator (e.g., a quadrangular box) and various menus (e.g., a configuration menu, a flash on/off menu, a recording menu, a gallery menu, and a camera menu) so that a user can recognize the motion detection area.

According to some embodiments, the processor may designate at least a partial area of a screen as a motion detection area based on a user gesture (e.g., a user gesture which draws a closed loop). For example, the processor may designate, as a motion detection area, a quadrangular area which has a minimum size and can include a circle or a polygonal closed loop corresponding to the user gesture. According to some embodiments, the user may edit a size, a position, a ratio, or the like of a motion detection area by using various interactions (e.g., a touch and a drag). This configuration will be described in detail below with reference to FIG. 7, FIG. 8A, and FIG. 8B.

In operation 203, the processor according to an embodiment of the present invention may notify the user that detection of motion is on standby (or super-slow recording is on standby). For example, as indicated by reference numeral 310 in FIG. 3A, when the motion detection area is designated (configured) and then a recording command is input (e.g., a recording menu 302 is touched), the processor may notify the user that motion is being detected. In this example, the processor may record an image at a first capturing speed (e.g., 30 fps). This notification may be provided visually. For example, as indicated by reference numeral 320 in FIG. 3A, the processor may display an outline of a quadrangular box, which represents the motion detection area 301, in a bold line. Alternatively, the processor may display the outline so as to have another line color or another line type. According to another embodiment, the processor may visually notify the user that detection of motion is on standby, by using a color, a transparency, or the like of a recording button. According to still another embodiment, the processor may provide a separate visual indicator (e.g., an icon or text). For example, as indicated by reference numeral 410 in FIG. 4, the processor may display a circular band-shaped indicator 402 instead of the recording menu 302.

According to some embodiments, the processor may notify the user that detection of motion is on standby, via at least one of a tactile sense or an auditory sense. According to some embodiments, the processor may combine at least two of the above-described various notification methods so as to notify the user that detection of motion is on standby.

In operation 205, the processor according to an embodiment of the present invention may determine whether motion is detected in the motion detection area. For example, the processor may determine whether an image of the motion detection area is changed. Alternatively, the processor may determine whether a subject in motion is detected in the motion detection area.

If it is determined in operation 205 that the motion is not detected, the processor may proceed to operation 211 described below. In contrast, if it is determined in operation 205 that the motion is detected, in operation 207, the processor may perform super-slow recording. For example, the processor may capture an image at a capturing speed (e.g., 960 fps) which is several times to tens of times faster than a normal capturing speed (e.g., 30 fps) by using an image sensor (e.g., the camera module 180). The super-slow recording may be performed for a designated time (e.g., 0.2 seconds) in consideration of performance of the image sensor.

According to an embodiment of the present invention, in operation 209, the processor may notify the user that the super-slow recording is in progress. The processor may visually notify the user that the super-slow recording is in progress. For example, as indicated by reference numerals 330 and 340 in FIG. 3B, the processor may further sequentially display quadrangular boxes of smaller sizes within a quadrangular box representing the motion detection area 301, and thus may provide an animation effect. Alternatively, as indicated by reference numeral 420 in FIG. 4, the processor may fill the circular band-shaped indicator 402 with a designated color as time passes. However, without being limited thereto, embodiments of the present invention may notify the user that the super-slow recording is in progress, by using various schemes (e.g., display of a separate icon and flickering of a recording button). According to some embodiments, the processor may notify the user that the super-slow recording is in progress, via at least one of a tactile sense or an auditory sense. According to some embodiments, the processor may combine at least two of the above-described schemes so as to notify the user that super-slow recording is in progress.

When the super-slow recording is completed, the processor may visually notify of completion of the super-slow recording. In this example, in the case of a multi-mode in which super-slow recording is performed multiple times, the processor may provide information on the number of times of recording. For example, as indicated by reference numeral 350 in FIG. 3B, in relation to the number of times of super-slow recording, the processor may display multiple indicators (e.g., which corresponds to the total number of times of super-slow recording), and may change the color of the indicators one by one whenever super-slow recording is completed. The view indicated by reference numeral 350 in FIG. 3B may signify that super-slow recording has been completed once.

In operation 211, the processor according to an embodiment of the present invention may determine whether recording is terminated. For example, when a recording termination menu is touched, the processor may determine (or recognize) that the recording is terminated. Alternatively, when the last super-slow recording is completed in relation to the configured number of times of super-slow recording (e.g., 20 times), the processor may determine that the recording is terminated. According to some embodiments, in the case of a single mode in which super-slow recording is performed only once, the processor may omit operation 211, and when super-slow recording is completed, may determine that recording is terminated.

If it is determined in operation 211 that recording termination is not requested, the processor may proceed to operation 205, and may repeat the above-described operations. In contrast, if it is determined in operation 211 that the recording termination is requested, the processor may store the recorded image, and may terminate recording control according to an embodiment of the present invention. The recorded image may include both an image recorded at a normal speed (30 fps) for about one second before start of super-slow recording, and an image recorded at a normal speed for about one second after completion of super-slow recording. Meanwhile, according to some embodiments, operation 203 and operation 209 of FIG. 2 may be omitted.

Figure 5:
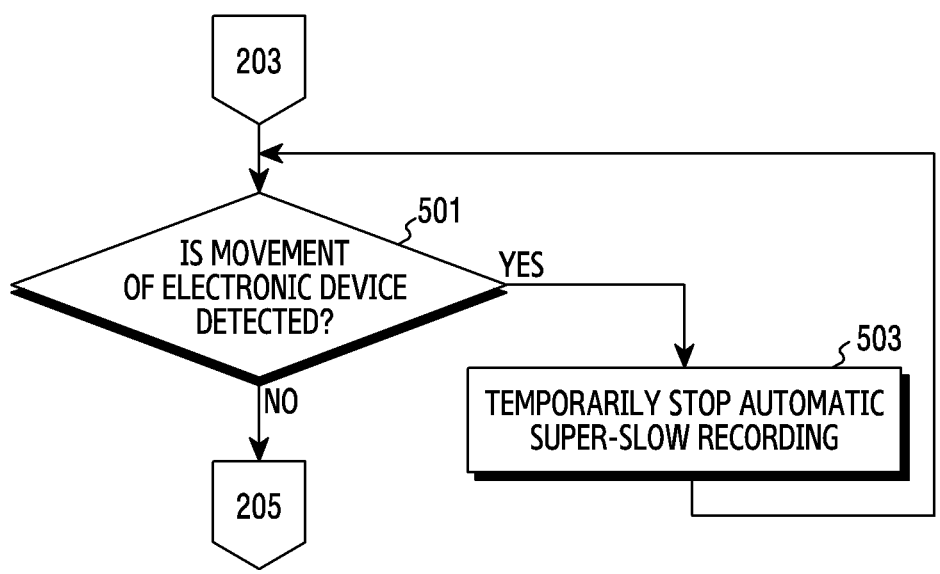
FIG. 5 is a flowchart illustrating a method for preventing incorrect recording according to an embodiment of the present invention.
Figure 6:
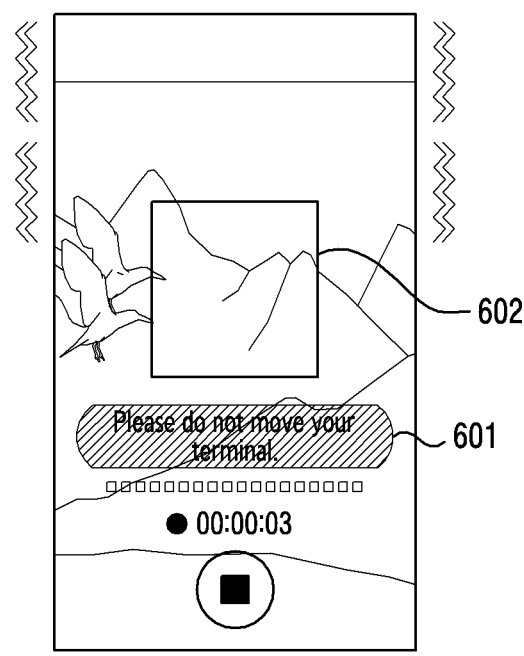
FIG. 6 is an exemplary view for describing a method for preventing incorrect recording according to an embodiment of the present invention.

FIG. 5 is a flowchart illustrating a method for preventing incorrect recording according to an embodiment of the present invention, and FIG. 6 is an exemplary view for describing a method for preventing incorrect recording according to an embodiment of the present invention.

Referring to FIG. 5 and FIG. 6, in operation 501, a processor (e.g., the processor 120 of FIG. 1) of an electronic device (e.g., the electronic device 101 of FIG. 1) according to an embodiment of the present invention may determine whether movement of the electronic device is detected. For example, the processor may determine whether a sensor signal or a data value corresponding to movement of the electronic device is received from a sensor module (e.g., the sensor module 176 of FIG. 1). Operation 501 may be performed after operation 203 of FIG. 2. According to some embodiments, operation 501 may be performed after operation 201.

If it is determined in operation 501 that the movement of the electronic device is not detected, the processor may proceed to operation 205 of FIG. 2. In contrast, if it is determined in operation 501 that the movement of the electronic device is detected, in operation 503, the processor may stop automatic super-slow recording according to detection of the movement. For example, the processor may stop detection of motion in a motion detection area. In this example, the processor may provide a warning message notifying of stoppage of the movement of the electronic device. For example, as illustrated in FIG. 6, the processor may control a display (e.g., the display apparatus 160 of FIG. 1) to output a warning message 601 reading "Please do not move your terminal." In this example, the processor may dim a screen so that a user can recognize that the automatic super-slow recording has been stopped due to the movement of the terminal. According to some embodiments, the processor may remove a quadrangular box representing a motion detection area 602, or may display an outline of the quadrangular box so as to have another color, another type, or the like of a line.

The above-described embodiment of the present invention allows prevention of incorrect recording according to movement of an electronic device. For example, in an embodiment of the present invention, when the electronic device is moved while super-slow recording is in standby, the processor may recognize that motion is detected in a motion detection area, and thus can solve the problem of automatically performing super-slow recording (an incorrect operation).

Figure 7:
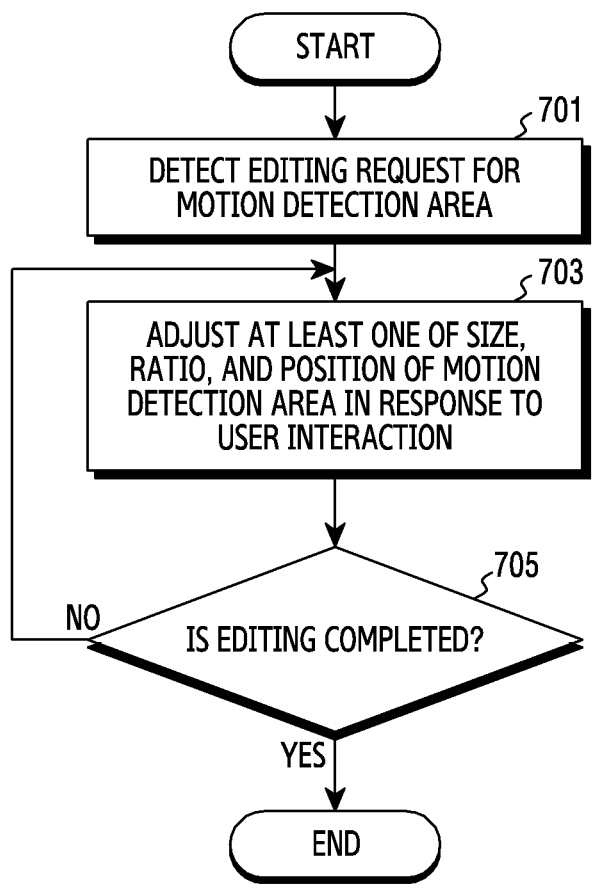
FIG. 7 is a flowchart illustrating a method for editing a motion detection area according to an embodiment of the present invention.
Figure 8A:
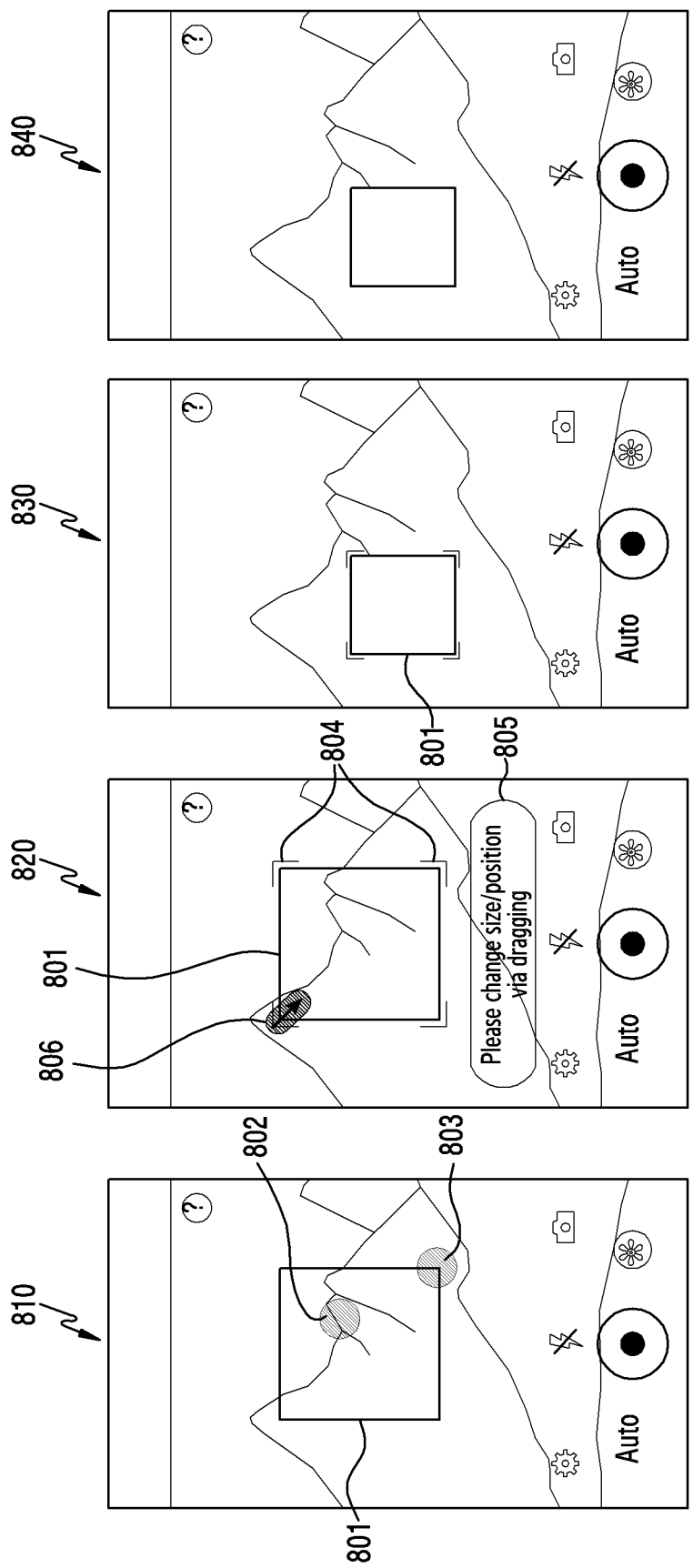
FIGS. 8A and 8B are exemplary views for describing a method for editing a motion detection area according to an embodiment of the present invention.
Figure 8B:
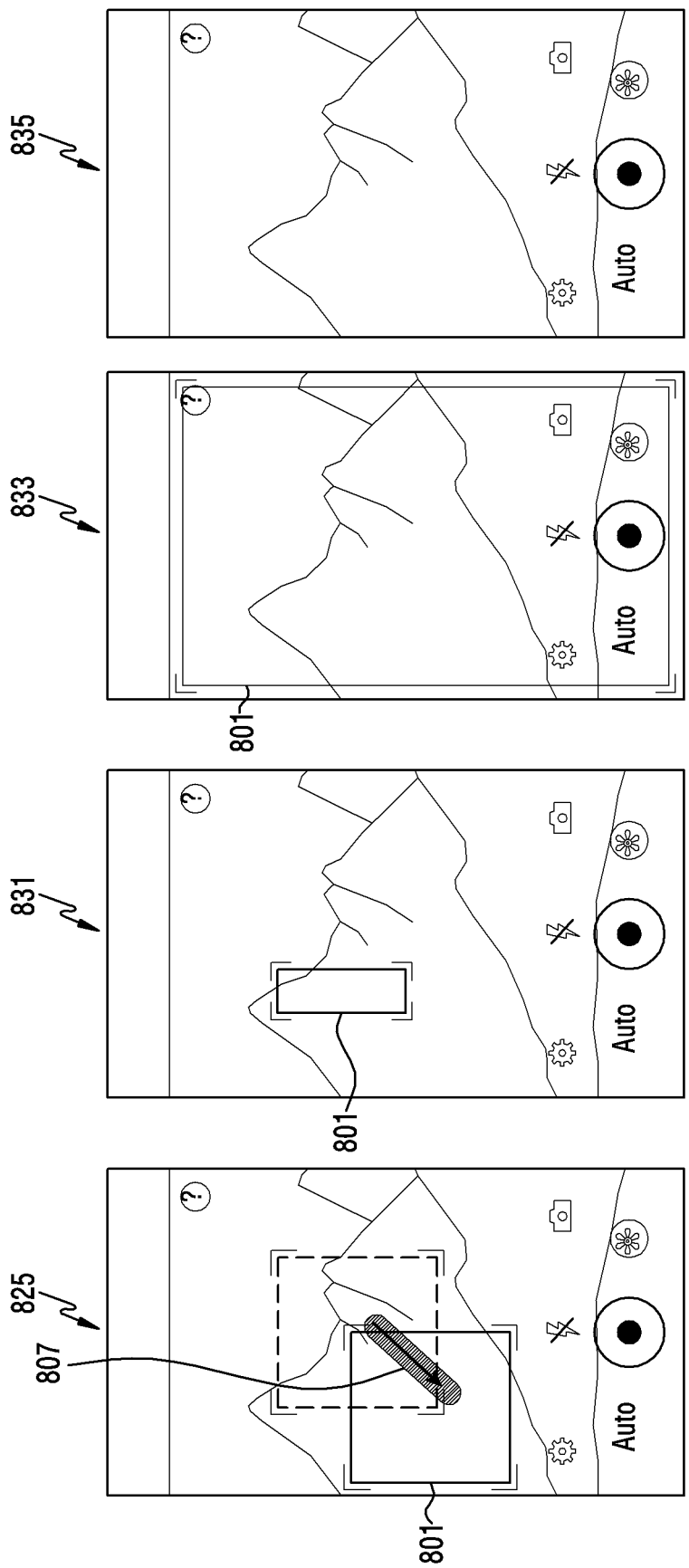

FIG. 7 is a flowchart illustrating a method for editing a motion detection area according to an embodiment of the present invention, and FIG. 8A and FIG. 8B are an exemplary view for describing a method for editing a motion detection area according to an embodiment of the present invention.

Referring to FIG. 7 to FIG. 8B, in operation 701, a processor (e.g., the processor 120 of FIG. 1) of an electronic device (e.g., the electronic device 101) according to an embodiment of the present invention may detect an editing request for a motion detection area. For example, as indicated by reference numeral 810 in FIG. 8A, when the processor detects a designated user gesture (e.g., a long touch 802 within a motion detection area 801 or a touch (or tap) 803 of an outline of the motion detection area 801), the processor may recognize that editing of the motion detection area 801 has been requested. According to some embodiments, when an edit menu included in a configuration menu is selected, the processor may recognize that editing of the motion detection area 801 has been requested. When the processor enters an editing state (or an editing mode) in response to the editing request, as indicated by reference numeral 820 in FIG. 8A, the processor may notify a user that the processor is in a state of being capable of editing the motion detection area 801 by using a visual indicator 804. This configuration is only an example, and embodiments of the present invention makes it possible to notify the user that the processor is in a state of editing the motion detection area 801, according to various schemes. Further, when the processor enters the editing mode, the processor may provide help (or guide information) 805 for an editing method at one side of a screen.

The editing of the motion detection area 801 may be requested on a recording standby screen (e.g., a screen before an input via a recording button (a preview screen)), or on a motion detection standby screen (e.g., a screen configured to identify whether motion is detected in the motion detection area after an input via a recording button).

In operation 703, the processor according to an embodiment of the present invention may adjust (or change) at least one of a size, a ratio, and a position of the motion detection area in response to a user interaction. For example, as indicated by reference numerals 820 and 830 in FIG. 8A, when the processor detects a user gesture 806 which touches a left upper end corner of the motion detection area 801 and then performs dragging in a direction of a right lower end, the processor may reduce the size of the motion detection area 801.

According to some embodiments, as indicated by reference numeral 825 in FIG. 8B, when the processor detects a user gesture 807 which touches an inside of the motion detection area 801 and then performs dragging in a certain direction (e.g., in a direction of a left lower end), the processor may move a position of the motion detection area 801.

According to some embodiments, as indicated by reference numeral 831 in FIG. 8B, the processor may change a width-to-length ratio of the motion detection area 801. According to another embodiment, as indicated by reference numeral 833 in FIG. 8B, the motion detection area 801 may be an entire screen. According to some embodiments, when the entire screen is designated as a motion detection area, as indicated by reference numeral 835 in FIG. 8B, the processor may not provide a visual representation (e.g., a quadrangular box) of the motion detection area 801.

In operation 705, the processor according to an embodiment of the present invention may determine whether the editing of the motion detection area is completed. For example, when a user input is not detected for a designated time (e.g., 3 seconds) or longer or an input for requesting separate editing termination is received, the processor may determine that the editing of the motion detection area is completed.

If it is determined in operation 705 that the editing of the motion detection area is not completed, the processor may return to operation 703, and may repeat the above-described operations. In contrast, if it is determined in operation 705 that the editing of the motion detection area is completed, the processor may terminate the editing of the motion detection area. For example, if the editing of the motion detection area is completed, as indicated by reference numeral 840 in FIG. 8A, the processor may remove the visual indicator 804 representing the editing state.

Figure 9:
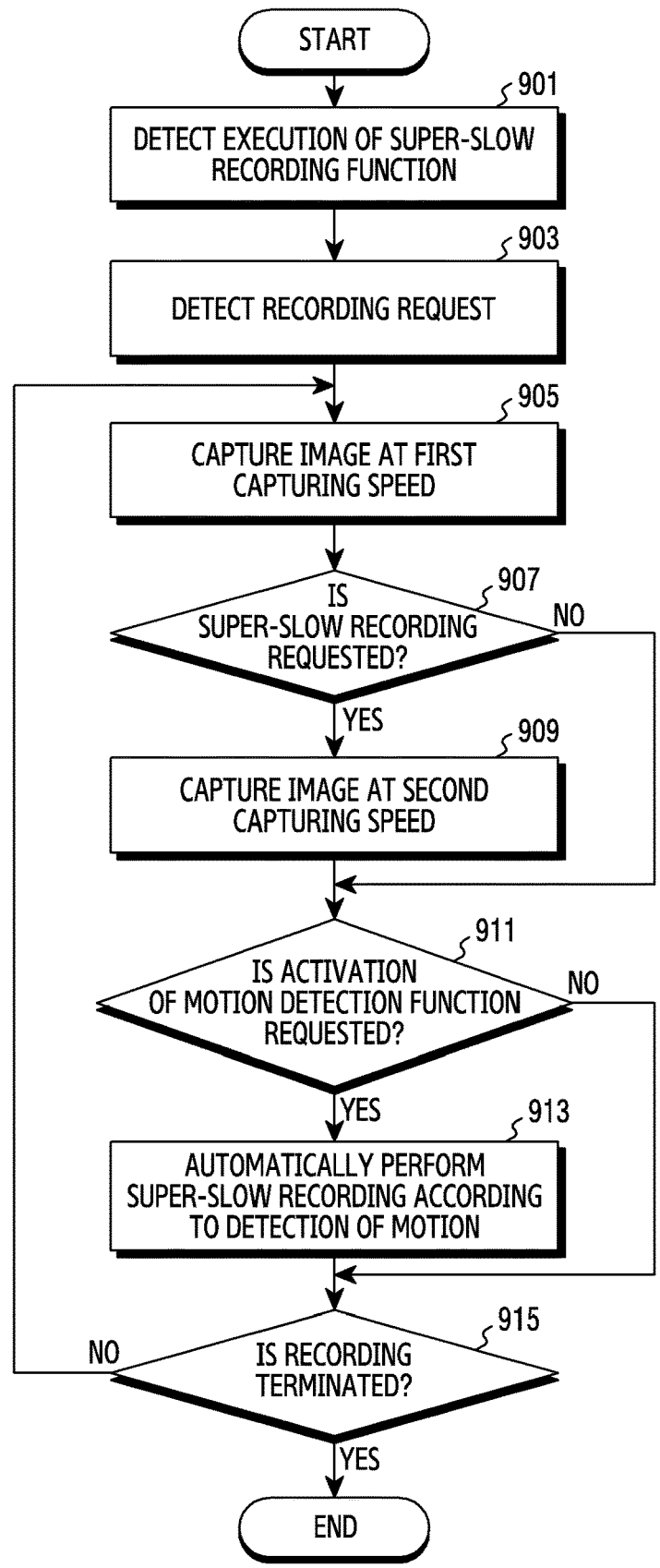
FIG. 9 is a flowchart illustrating a recording method of an electronic device according to an embodiment of the present invention.
Figure 10A:
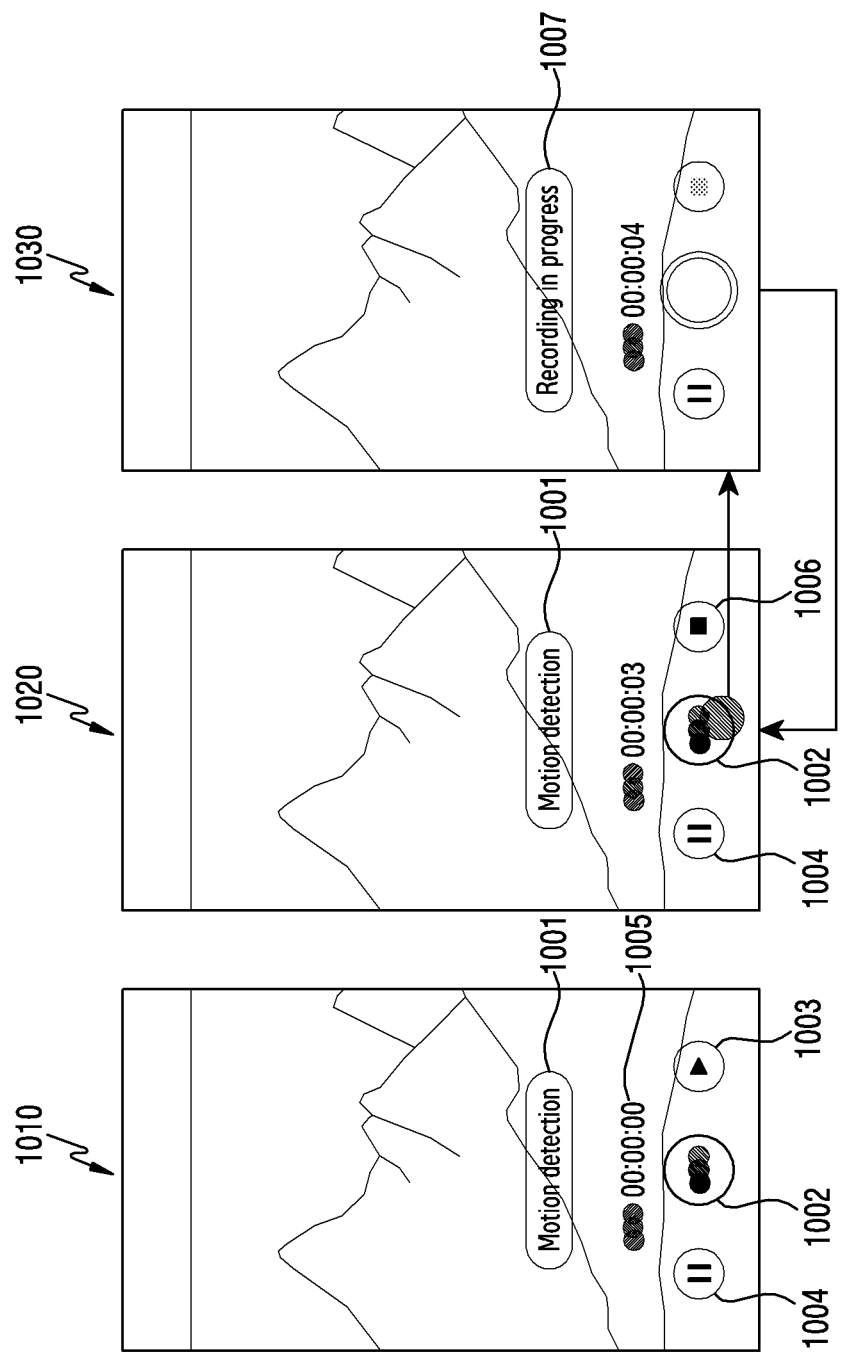
FIGS. 10A and 10B are exemplary views for describing a recording method of an electronic device according to an embodiment of the present invention.

FIG. 9 is a flowchart illustrating a recording method of an electronic device according to an embodiment of the present invention, and FIG. 10A and FIG. 10 are an exemplary view for describing a recording method of an electronic device according to an embodiment of the present invention.

Figure 10B:
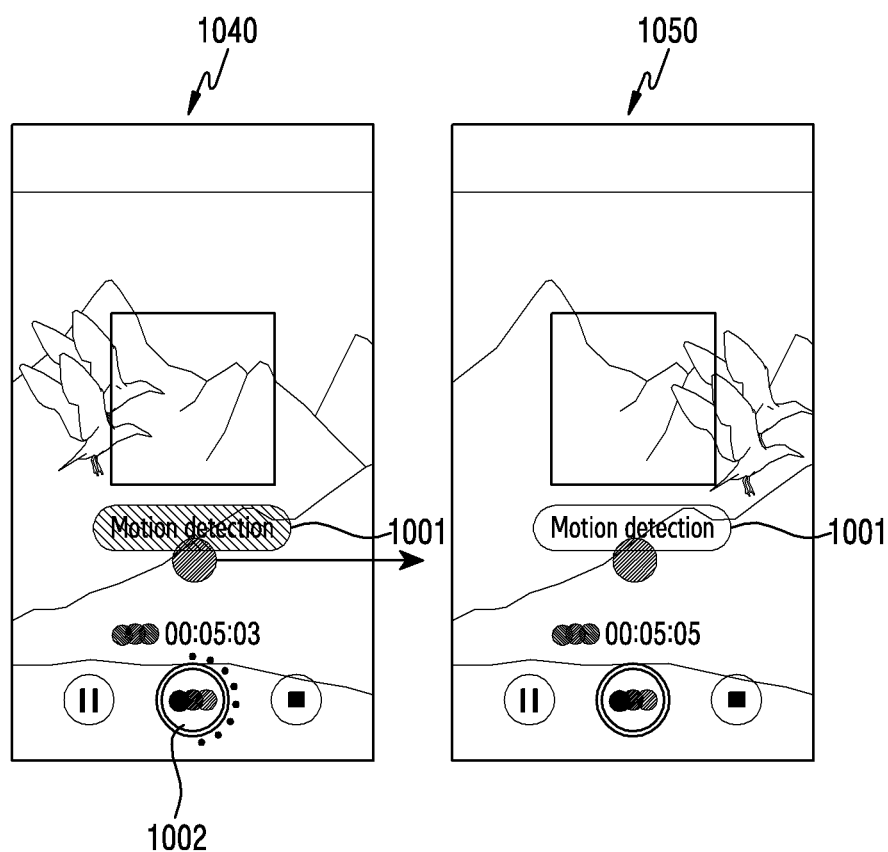

Referring to FIG. 9 to FIG. 10B, in operation 901, a processor (e.g., the processor 120 of FIG. 1) of the electronic device (e.g., the electronic device 101) according to an embodiment of the present invention may detect execution of a function for super-slow recording (or super-slow capturing). In response to the execution of the super-slow recording function, the processor may control a display (e.g., the display apparatus 160 of FIG. 1) to display a recording standby screen. As indicated by reference numeral 1010 in FIG. 10A, the recording standby screen may include, at one side thereof, a motion detection function button (or menu) 1001, a super-slow recording button 1002, a recording button 1003, a pause button 1004, a recording time information 1005, and the like.

In operation 903, the processor according to an embodiment of the present invention may detect a recording request. For example, the processor may detect a touch of the recording button 1003.

In response to the recording request, in operation 905, the processor may capture an image at a first capturing speed (e.g., 30 fps). As indicated by reference numeral 1020 in FIG. 10A, the processor may record an image at the first capturing speed. In this example, the recording button 1003 may be changed to a recording termination button 1006.

In operation 907, the processor according to an embodiment of the present invention may determine whether super-slow recording is requested. For example, the processor may determine whether the super-slow recording button 1002 is touched.

If it is determined in operation 907 that the super-slow recording is not requested, the processor may proceed to operation 911 described below. In contrast, if it is determined in operation 907 that the super-slow recording is requested, in operation 909, the processor may capture an image at a second capturing speed (e.g., 960 fps), and thus may perform the super-slow recording. For example, as indicated by reference numerals 1020 and 1030 in FIG. 10A, when the super-slow recording button 1002 is touched during normal recording, the processor may perform super-slow recording. In this example, the processor may visually notify a user that the super-slow recording is in progress. For example, the processor may change at least one of a color, a shape, or a transparency of each of the super-slow recording button 1002, the pause button 1004, and the recording termination button 1006. Alternatively, the processor may display, at one side of a screen, text information 1007 notifying that recording is in progress. As described above, embodiments of the present invention make it possible to manually perform super-slow recording via the super-slow recording button 1002.

After the super-slow recording is completed, in operation 911, the processor according to an embodiment of the present invention may determine whether activation (turning-on) of a motion detection function is requested. For example, as indicated by reference numeral 1040 in FIG. 10B, the processor may determine whether the motion detection function button 1001 is touched.

If it is determined in operation 911 that the activation of the motion detection function is not requested, the processor may proceed to operation 915 described below. In contrast, if it is determined in operation 911 that the activation of the motion detection function is requested, in operation 913, the processor may automatically perform super-slow recording in response to detection of motion. For example, as indicated by reference numerals 1040 and 1050 in FIG. 10B, when motion is detected in a designated motion detection area, the processor may automatically perform super-slow recording. The processor may visually notify that the super-slow recording is automatically being performed. The processor may notify the user that the super-slow recording is automatically being performed, according to a scheme different from the visual notification of execution of super-slow recording by the user as indicated by reference numeral 1030 in FIG. 10A. For example, as indicated by reference numeral 1040 in FIG. 10B, the processor may provide an animation for sequentially displaying multiple points along the perimeter of the super-slow recording button 1002.

Meanwhile, as indicated by reference numeral 1050 in FIG. 10B, when the motion detection function button 1001 is touched in a state in which a motion detection function is turned on, the processor may turn off the motion detection function.

In operation 915, the processor according to an embodiment of the present invention may determine whether recording is terminated. For example, when the recording termination button 1005 is touched, the processor may recognize that the recording is terminated. Alternatively, when the last super-slow recording is completed in relation to the configured number of times of super-slow recording (e.g., 20 times), the processor may determine that the recording is terminated.

If it is determined in operation 915 that recording termination is not detected, the processor may proceed to operation 905, and may repeat the above-described operations. In contrast, if it is determined in operation 915 that the recording termination is detected, the processor may store the recorded image, and may terminate recording control according to an embodiment of the present invention.

Figure 11:
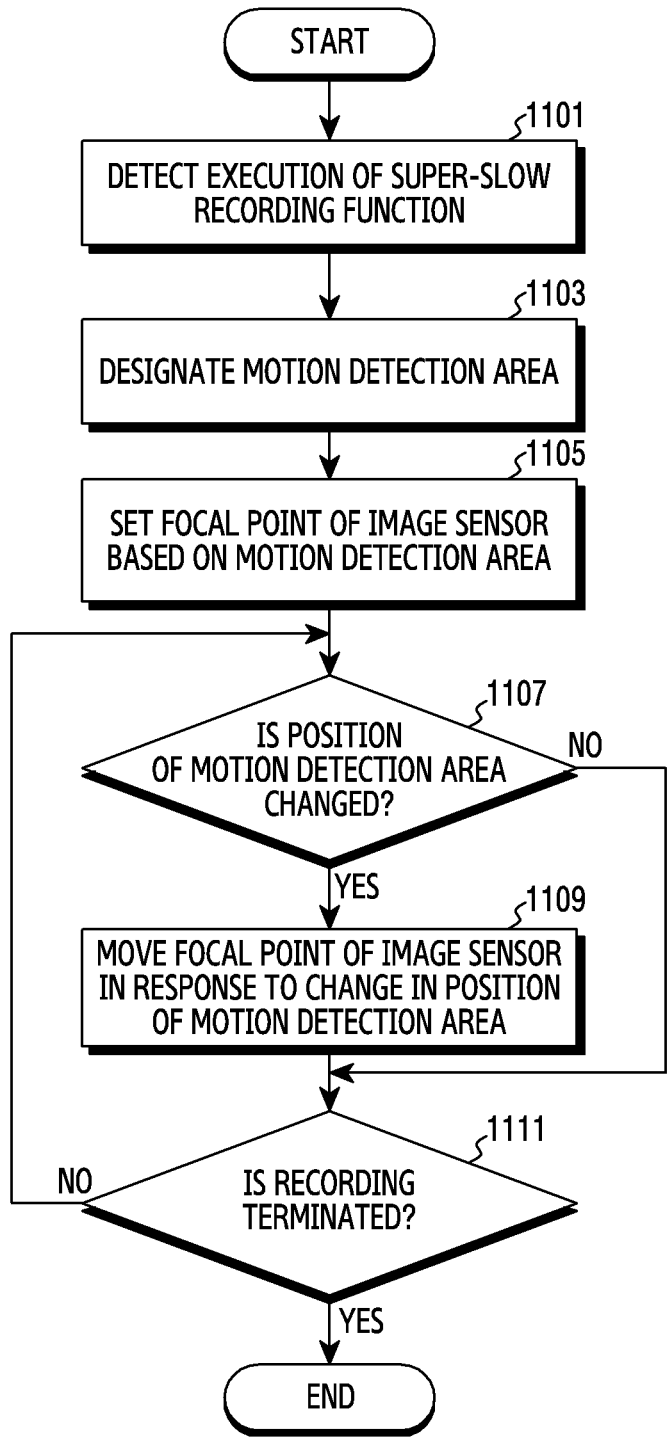
FIG. 11 is a flowchart illustrating a method for configuring a focal point during recording in an electronic device according to an embodiment of the present invention.
Figure 12A:
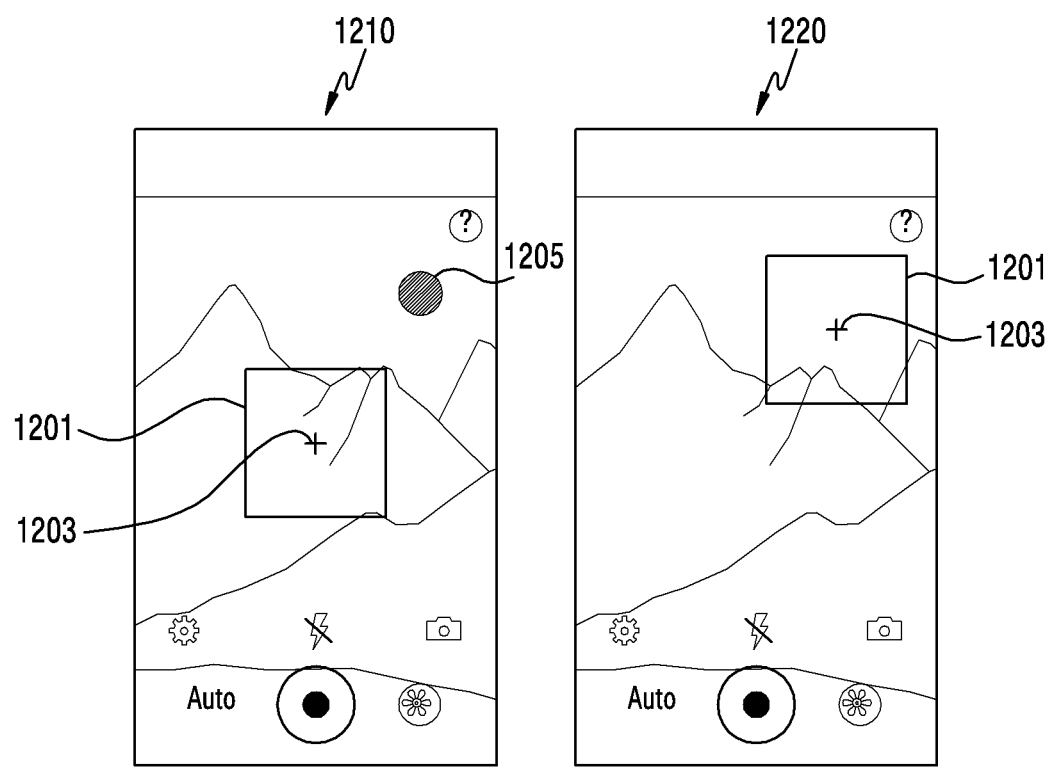
FIGS. 12A and 12B are exemplary views for describing a method for configuring a focal point during recording in an electronic device according to an embodiment of the present invention.
Figure 12B:
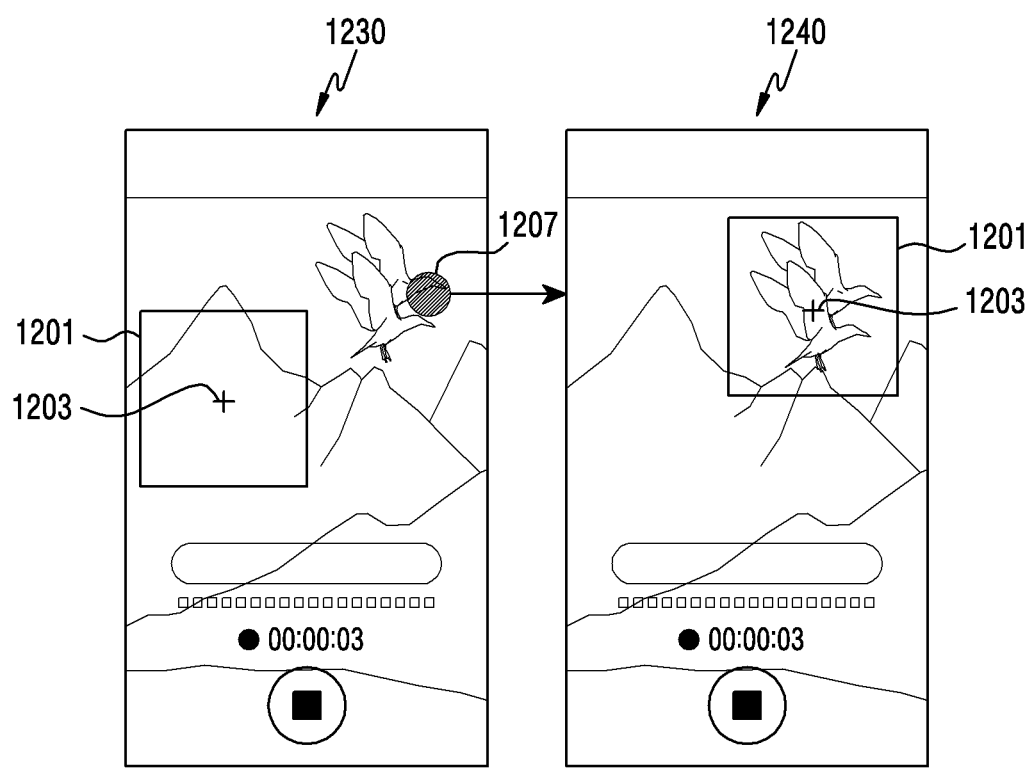

FIG. 11 is a flowchart illustrating a method for configuring a focal point during recording in an electronic device according to an embodiment of the present invention, and FIG. 12A and FIG. 12B are an exemplary view for describing a method for configuring a focal point during recording in an electronic device according to an embodiment of the present invention.

Referring to FIG. 11 to FIG. 12B, in operation 1101, a processor (e.g., the processor 120 of FIG. 1) of the electronic device (e.g., the electronic device 101) according to an embodiment of the present invention may execute a function for super-slow recording (or super-fast capturing).

In operation 1103, the processor according to an embodiment of the present invention may designate a motion detection area. For example, the processor may automatically or manually (via a user input) designate at least a partial area of a screen as a motion detection area.

In operation 1105, the processor according to an embodiment of the present invention may set a focal point of an image sensor (e.g., the camera module 180 of FIG. 1) based on the motion detection area. For example, as indicated by reference numeral 1210 in FIG. 12A, the processor may set a focal point 1203 at a center of a motion detection area 1201.

In operation 1107, the processor according to an embodiment of the present invention may determine whether a position of the motion detection area is changed. For example, as indicated by reference numerals 1210 and 1220 in FIG. 12A, when a user touches one side (e.g., a right upper end) on a record standby screen as indicated by reference numeral 1205, the processor may change a position of the motion detection area 1201 based on the touched point. According to some embodiments, as indicated by reference numerals 1230 and 1240 in FIG. 12B, when the user touches one side (e.g., a right upper end) of a screen (as indicated by reference numeral 1207) while an image is recorded, the processor may change a position of the motion detection area 1201 based on the touched point.

If it is determined in operation 1107 that the position of the motion detection area is not changed, the processor may proceed to operation 1111 described below. In contrast, if it is determined in operation 1107 that the position of the motion detection area is changed, in operation 1109, the processor may move (or readjust) a focal point of an image sensor in response to a change in the position of the motion detection area. For example, as indicated by reference numeral 1220 in FIG. 12A, when the motion detection area 1201 is moved to a right upper end on a recording standby screen, the processor may move the focal point 1203 to a center of the moved motion detection area 1201.

According to some embodiments, as indicated by reference numeral 1240 in FIG. 12B, when the motion detection area 1201 is moved to a right upper end during recording, the processor may move the focal point 1203 to a center of the moved motion detection area 1201.

In operation 1111, the processor according to an embodiment of the present invention may determine whether termination of a recording function is requested. If the termination of the recording function is not requested, the processor may return to operation 1107, and may repeat the above-described operations. In contrast, if the termination of the recording function is requested, the processor may terminate the recording.

Figure 13:
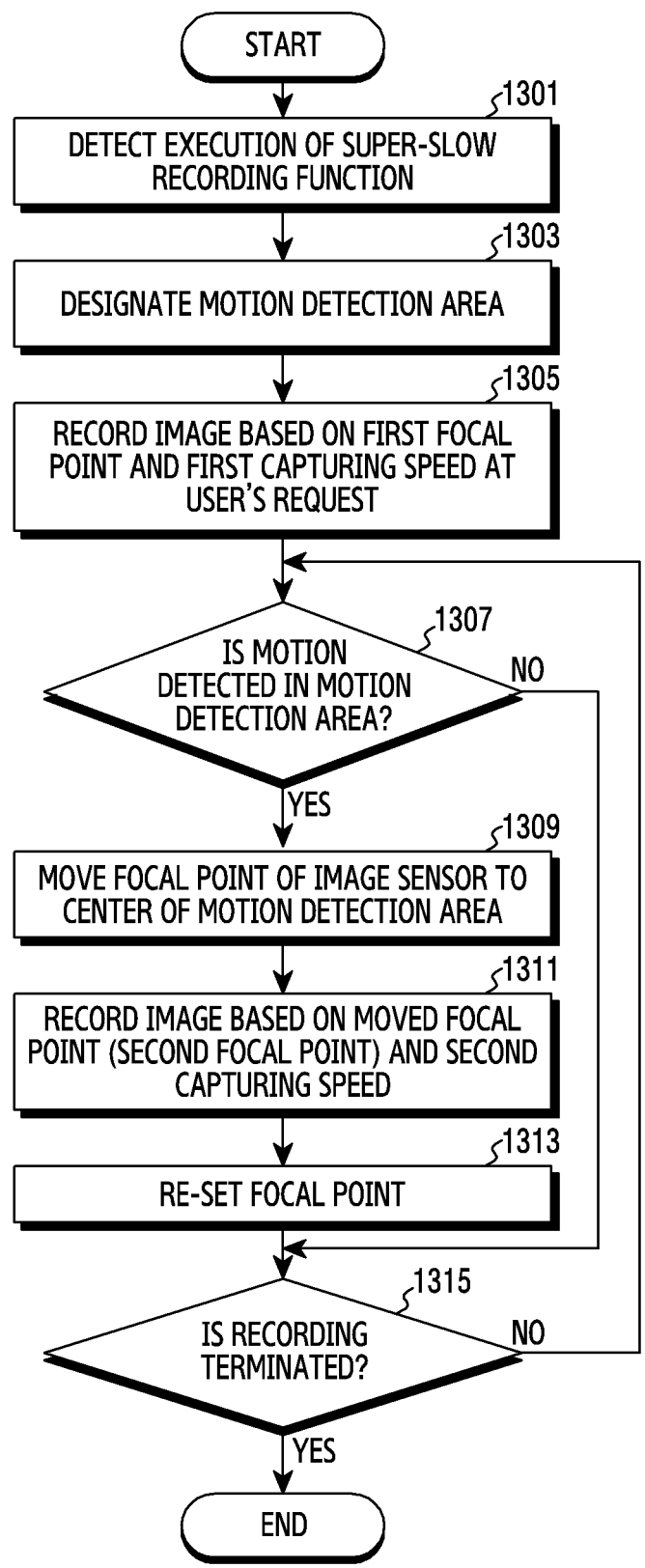
FIG. 13 is a flowchart illustrating a method for moving a focal point during recording in an electronic device according to an embodiment of the present invention.
Figure 14:
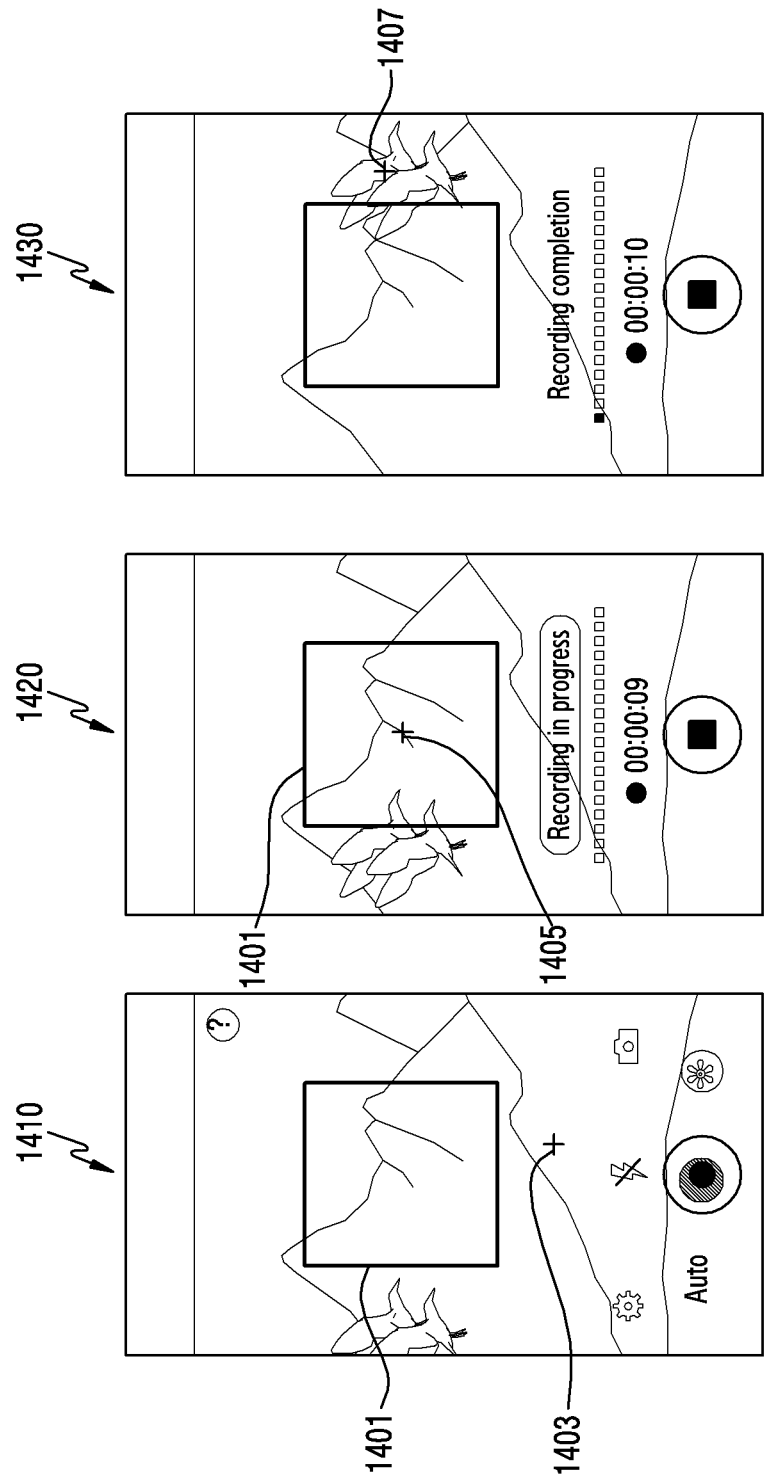
FIG. 14 is an exemplary view for describing a method for moving a focal point during recording in an electronic device according to an embodiment of the present invention.

FIG. 13 is a flowchart illustrating a method for moving a focal point during recording in an electronic device according to an embodiment of the present invention, and FIG. 14 is an exemplary view for describing a method for moving a focal point during recording in an electronic device according to an embodiment of the present invention.

Referring to FIG. 13 and FIG. 14, in operation 1301, a processor (e.g., the processor 120 of FIG. 1) of the electronic device (e.g., the electronic device 101) according to an embodiment of the present invention may execute a function for super-slow recording (or super-fast capturing).

In operation 1303, the processor according to an embodiment of the present invention may designate a motion detection area. For example, the processor may automatically or manually (via a user input) designate at least a partial area of a screen as a motion detection area.

In operation 1305, the processor according to an embodiment of the present invention may record an image based on a first focal point and a first capturing speed (e.g., 30 fps) at a user's request. For example, as indicated by reference numeral 1410 in FIG. 14, the processor may record an image at a first capturing speed in a state in which a first focal point 1403 is configured near a lower end of a motion detection area 1401. The first focal point 1403 may be configured by the user or an auto-focus function.

In operation 1307, the processor according to an embodiment of the present invention may determine whether motion (or a subject in motion) is detected in the motion detection area. If it is determined in operation 1307 that the motion is not detected, the processor may proceed to operation 1315 described below. In contrast, if it is determined in operation 1307 that the motion is detected, in operation 1309, the processor may move a focal point of an image sensor (e.g., the camera module 180 of FIG. 1) to a center of the motion detection area 1401. For example, as indicated by reference numeral 1420 in FIG. 14, when motion of a subject (e.g., a bird) is detected in the motion detection area 1401, the processor may move the focal point 1403 to the center of the motion detection area 1401. Hereinafter, for convenience of description, a moved focal point will be referred to as a "second focal point 1405".

According to some embodiments, the processor may configure a focal-point moving area, and when motion is detected in the focal-point moving area, may move a focal point to a motion detection area. The focal-point moving area may be configured to be larger by a designated size than the motion detection area. The designated size may be determined in consideration of a focal-point moving time.

In operation 1311, the processor according to an embodiment of the present invention may record an image based on a second focal point and a second capturing speed (e.g., 960 fps). For example, as indicated by reference numeral 1420 in FIG. 14, the processor may move the focal point 1403, and may then record an image based on a second focal point 1405 and a second capturing speed (e.g., 960 fps). Recording of an image at the second capturing speed (e.g., 960 fps) may be performed for a designated time (e.g., 0.2 seconds).

In operation 1313, the processor according to an embodiment of the present invention may re-set a focal point. For example, as indicated by reference numeral 1430 in FIG. 14, when the recording of an image at the second capturing speed is completed, the processor may re-set a third focal point 1407. The third focal point 1407 may be automatically set by an auto-focus function.

In operation 1315, the processor according to an embodiment of the present invention may determine whether termination of a recording function is requested. If the termination of the recording function is not requested, the processor may return to operation 1307, and may repeat the above-described operations. In contrast, if the termination of the recording function is requested, the processor may terminate the recording function.

Figure 15:
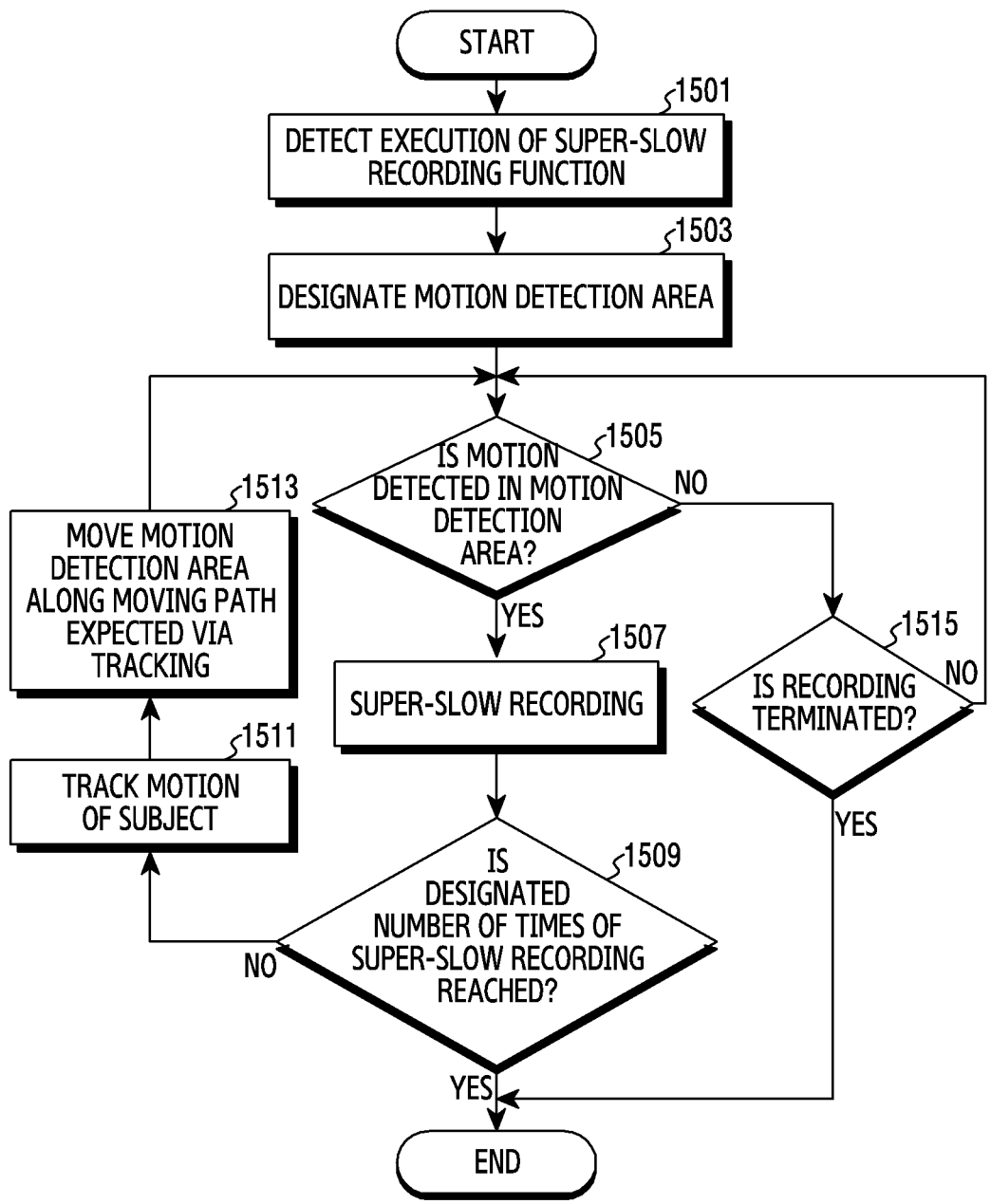
FIG. 15 is a flowchart illustrating a method for configuring a motion detection area according to an embodiment of the present invention.
Figure 16:
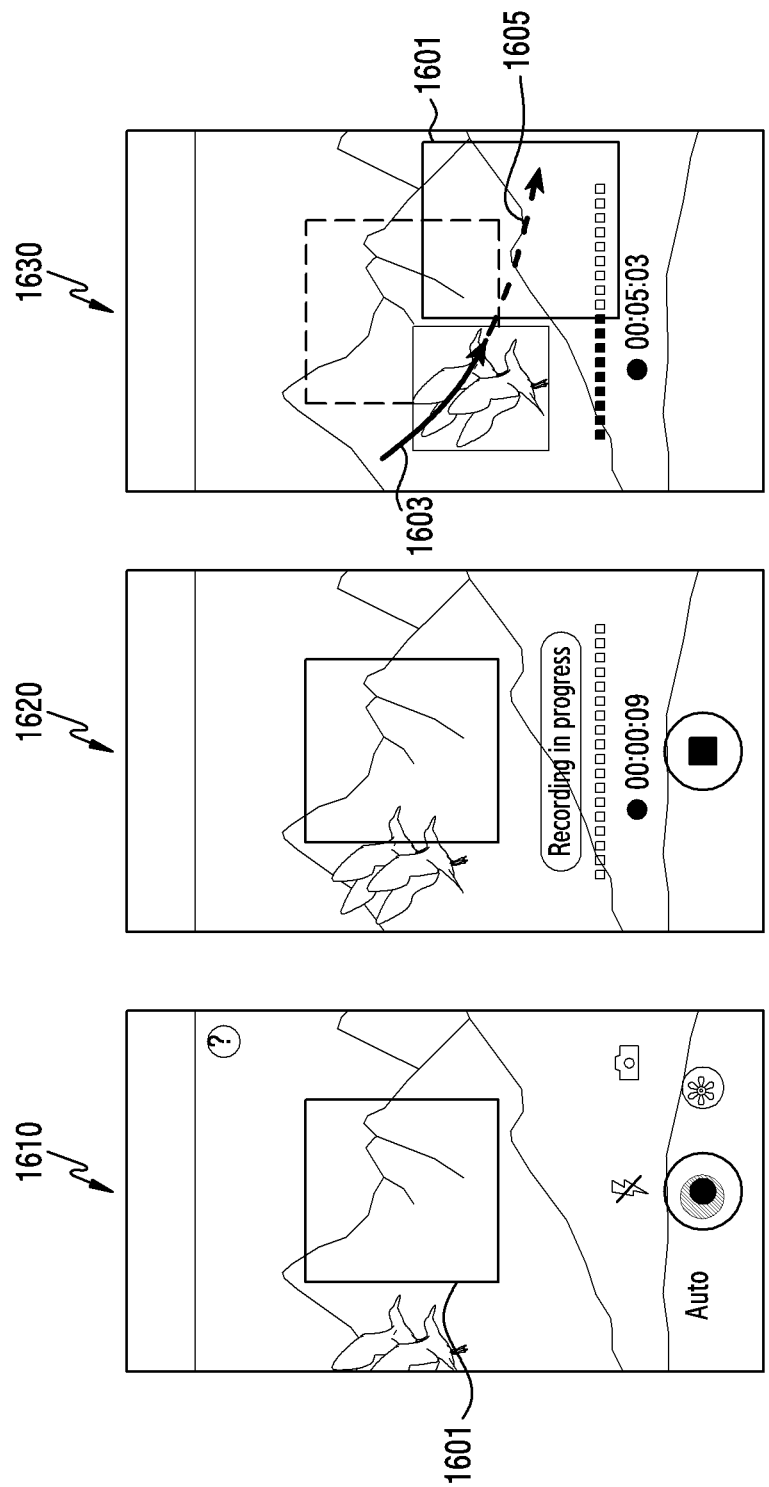
FIG. 16 is an exemplary view for describing a method for configuring a motion detection area according to an embodiment of the present invention.

FIG. 15 is a flowchart illustrating a method for configuring a motion detection area according to an embodiment of the present invention, and FIG. 16 is an exemplary view for describing a method for configuring a motion detection area according to an embodiment of the present invention.

Referring to FIG. 15 and FIG. 16, in operation 1501, a processor (e.g., the processor 120 of FIG. 1) of an electronic device (e.g., the electronic device 101) according to an embodiment of the present invention may detect execution of a function for super-slow recording (or super-fast capturing).

In operation 1503, the processor according to an embodiment of the present invention may designate a motion detection area. For example, as described above, the processor may automatically or manually (via a user input) designate at least a partial area of a screen as a motion detection area. For example, as indicated by reference numeral 1610 in FIG. 16, the processor may designate a motion detection area 1601.

In operation 1505, the processor according to an embodiment of the present invention may determine whether motion (or a subject in motion) is detected in the motion detection area. If it is determined in operation 1505 that the motion is detected, in operation 1507, the processor may perform super-slow recording. For example, as indicated by reference numeral 1620 in FIG. 16, when motion of a subject (e.g., a bird) is detected in the motion detection area 1601, the processor may capture an image at a super-high speed (e.g., 960 fps), and thus may perform super-slow recording.

In operation 1509, the processor according to an embodiment of the present invention may determine whether the number of times of super-slow recording reaches the designated number of times of super-slow recording (e.g., 20 times). For example, when recording is completed, the processor may count up the number of times of recording, and may determine whether the counted number of times of recording is 20.

If it is determined in operation 1509 that the counted number of times of recording does not reach the designated number of times of recording, in operation 1511, the processor may track the motion of the subject. In operation 1513, the processor may move the motion detection area along a moving path of the subject expected (or predicted) via tracking. For example, as indicated by reference numeral 1630 in FIG. 16, the processor may calculate an expected moving path 1605 for N seconds (e.g., 15 seconds, i.e., a time for which super-slow recording is again available) based on a moving path 1603 of the subject. The processor may move the motion detection area 1601 based on the expected moving path 1605. After moving the motion detection area 1601, the processor may return to operation 1505, and may repeat the above-described operations.

In contrast, if it is determined in operation 1509 that the counted number of times of recording reaches the designated number of times of recording, the processor may terminate the recording.

Meanwhile, if it is determined in operation 1505 that the motion is not detected, in operation 1515, the processor may determine whether recording termination is requested. If it is determined in operation 1515 that the recording termination is not requested, the processor may return to operation 1505. In contrast, if it is determined in operation 1515 that the recording termination is requested, the processor may terminate the recording. In the above-described embodiment of the present invention, a subject may be tracked, and super-slow recording may be performed continuously by the designated number of times.

According to various embodiments of the present invention, a recording method of an electronic device (e.g., the electronic device 101) may include: designating at least a partial area of a screen as a motion detection area; determining whether a motion is detected in the motion detection area; and controlling an image sensor (e.g., the camera module 180) so as to perform super-slow recording, in response to detecting the motion in the motion detection area.

According to various embodiments, the recording method may further include at least one of: notifying a user that a motion detection using the motion detection area is being performed; or notifying the user that the super-slow recording is being performed.

According to various embodiments, the recording method may further include: detecting an editing request for the motion detection area; entering an editing mode for the motion detection area in response to the editing request; and changing at least one of a size, a ratio, or a position of the motion detection area in response to a user interaction.

According to various embodiments, the recording method may further include: detecting movement of the electronic device via at least one sensor (e.g., the sensor module 176); and stopping the detection of the motion in the motion detection area in response to detecting the movement of the electronic device via the at least one sensor.

According to various embodiments, the recording method may further include setting a focal point of the image sensor based on a center of the motion detection area in response to designating the motion detection area.

According to various embodiments, the recording method may further include moving the focal point of the image sensor to the center of the motion detection area in response to detecting the motion in the motion detection area, and performing the super-slow recording.

According to various embodiments, the recording method may further include re-setting a focal point of the image sensor in response to completion of the super-slow recording.

According to various embodiments, the recording method may further include: tracking a moving path of an object of the super-slow recording; expecting a moving path based on a tracking result; and moving the motion detection area along the expected moving path.

According to various embodiments, the recording method may further include performing super-slow recording in response to a user input.

According to various embodiments, the recording method may further include: determining whether a touch is generated in an area other than the motion detection area; and moving the motion detection area and a focal point of the image sensor based on a touched point in response to generation of the touch.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136, or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a display;
    an image sensor configured to acquire an image;
    a processor configured to be operatively connected to the display and the image sensor; and
    a memory configured to be operatively connected to the processor,
    wherein the memory is further configured to store instructions that, when executed, cause the processor to:
        control the image sensor to acquire a first image at a first frame rate,
        detect whether a super-slow recording function is activated,
        in response to the super-slow recording function being activated, control the display to display a visual indicator corresponding to a motion detection area on a preview screen, wherein the motion detection area is a partial area of the preview screen, corresponds to a predesignated position of the preview screen, and has a predesignated size,
        determine whether a motion is detected within the motion detection area based on whether an image of the motion detection area is changed,
        in response to detecting the motion within the motion detection area, control the image sensor to acquire a second image at a second frame rate faster than the first frame rate,
        track a moving path of an object,
        calculate an expected moving path for a time for which super-slow recording is available again based on a tracking result, and
        move the motion detection area along with the expected moving path.

2. The electronic device as claimed in claim 1, wherein the memory is configured to further store an instruction that causes the processor to notify a user that a motion detection using the motion detection area is being performed.

3. The electronic device as claimed in claim 1, wherein the memory is configured to further store instructions that cause the processor to change at least one of a size, a ratio, or a position of the motion detection area in response to an editing request for the motion detection area.

4. The electronic device as claimed in claim 1, further comprising:
    at least one sensor configured to detect movement of the electronic device,
    wherein the memory is configured to further store instructions that cause the processor to stop the detection of the motion within the motion detection area in response to detecting the movement of the electronic device via the at least one sensor.

5. The electronic device as claimed in claim 1, wherein the memory is configured to further store instructions that cause the processor to set a focal point of the image sensor based on a center of the motion detection area.

6. The electronic device as claimed in claim 1, wherein the memory is configured to further store an instruction that causes the processor to configure an area for moving a focal point of the image sensor so as to be larger than the motion detection area.

7. The electronic device as claimed in claim 1, wherein the memory is configured to further store an instruction that causes the processor to, when a touch is detected at one side of the display while the motion is detected within the motion detection area, move the motion detection area and a focal point of the image sensor based on a point at which the touch is generated.

8. A recording method of an electronic device, the recording method comprising:
    controlling an image sensor to acquire a first image at a first frame rate;
    detecting whether a super-slow recording function is activated;
    in response to the super-slow recording function being activated, displaying a visual indicator corresponding to a motion detection area on a preview screen, wherein the motion detection area is a partial area of the preview screen, corresponds to a predesignated position of the preview screen, and has a predesignated size;
    determining whether a motion is detected within the motion detection area based on whether an image of the motion detection area is changed;
    in response to detecting the motion within the motion detection area, controlling the image sensor to acquire a second image at a second frame rate faster than the first frame rate;
    tracking a moving path of an object;
    calculating an expected moving path for a time for which super-slow recording is available again based on a tracking result; and
    moving the motion detection area along with the expected moving path.

9. The recording method as claimed in claim 8, further comprising notifying a user that a motion detection using the motion detection area is being performed.

10. The recording method as claimed in claim 8, further comprising:
 detecting an editing request for the motion detection area;
 entering an editing mode for the motion detection area in response to the editing request; and
 changing at least one of a size, a ratio, or a position of the motion detection area in response to a user interaction.

11. The recording method as claimed in claim 8, further comprising:
 detecting movement of the electronic device via at least one sensor; and
 stopping the detection of the motion within the motion detection area in response to detecting the movement of the electronic device via the at least one sensor.

12. The recording method as claimed in claim 8, further comprising:
 setting a focal point of the image sensor based on a center of the motion detection area.

13. The recording method as claimed in claim 8, further comprising:
 determining whether a touch is generated in an area other than the motion detection area; and
 moving the motion detection area and a focal point of the image sensor based on a touched point in response to generation of the touch.

14. The electronic device as claimed in claim 1, wherein the memory is configured to further store instructions that cause the processor to move a focal point of the image sensor to the center of the motion detection area in response to detecting the motion within the motion detection area.

15. The electronic device as claimed in claim 1, wherein the memory is configured to further store instructions that cause the processor to activate the super-slow recording function in response to a user input selecting a super-slow recording menu displayed on one side of a display.

16. The recording method as claimed in claim 8, further comprising:
 moving a focal point of the image sensor to the center of the motion detection area in response to detecting the motion within the motion detection area; and
 controlling the image sensor to acquire the second image based on the moved focal point.

\* \* \* \* \*